United States Patent [19]

Yokomizo

[11] 4,225,641
[45] Sep. 30, 1980

[54] PICTURE-MAKING DEVICE

[76] Inventor: Motohiro Yokomizo, Ohkawa-cho, No. 2-15, Senju, Adachi-ku, Tokyo, Japan

[21] Appl. No.: 864,937

[22] Filed: Dec. 27, 1977

[30] Foreign Application Priority Data

Mar. 18, 1977 [JP] Japan .............................. 52-32114[U]
Jul. 8, 1977 [JP] Japan .............................. 52-90460[U]

[51] Int. Cl.$^2$ .............................................. B32B 3/14
[52] U.S. Cl. ......................................... 428/41; 35/27; 156/63; 156/233; 156/234; 428/35; 428/38; 428/914
[58] Field of Search .......................... 428/914, 40–42, 428/77, 78, 38, 187, 35; 35/27; 40/594; 156/63, 233, 234

[56] References Cited

U.S. PATENT DOCUMENTS

| 2,896,351 | 7/1959 | Johnson | 428/41 X |
| 2,985,554 | 5/1961 | Dickard | 428/40 |
| 2,987,103 | 6/1961 | Yakubik | 428/203 |
| 2,993,806 | 7/1961 | Fisher et al. | 428/216 |
| 3,002,309 | 10/1961 | Snyder | 428/47 X |
| 3,021,250 | 2/1962 | LaVoie | 156/324 |
| 3,160,549 | 12/1964 | Caldwell et al. | 428/352 X |
| 3,464,842 | 9/1969 | Jackstadt | 428/40 X |
| 3,466,217 | 9/1969 | Mott | 428/41 |
| 3,480,500 | 11/1969 | Hotter | 156/220 |
| 3,503,835 | 3/1970 | Hermann | 428/41 |
| 3,532,652 | 10/1970 | Zang et al. | 428/40 X |
| 3,556,894 | 1/1971 | Bernard | 428/40 X |
| 3,854,229 | 12/1974 | Morgan | 428/40 X |
| 3,942,621 | 3/1976 | Karlan | 428/914 X |
| 3,961,121 | 6/1976 | Warsager | 428/914 X |
| 4,021,552 | 3/1977 | Watts | 428/914 X |

Primary Examiner—Henry F. Epstein
Attorney, Agent, or Firm—Young & Thompson

[57] ABSTRACT

A picture-making device which comprises in combination a picture-making plate and a transfer film. The picture-making plate comprises a base plate with an adhesive layer disposed on one surface of the base plate and a liner superposed releasably on the adhesive layer. The transfer film carries on one surface thereof a releasable layer to be transferred in part to a portion of the adhesive layer from which a corresponding overlying portion of the liner has been removed.

9 Claims, 20 Drawing Figures

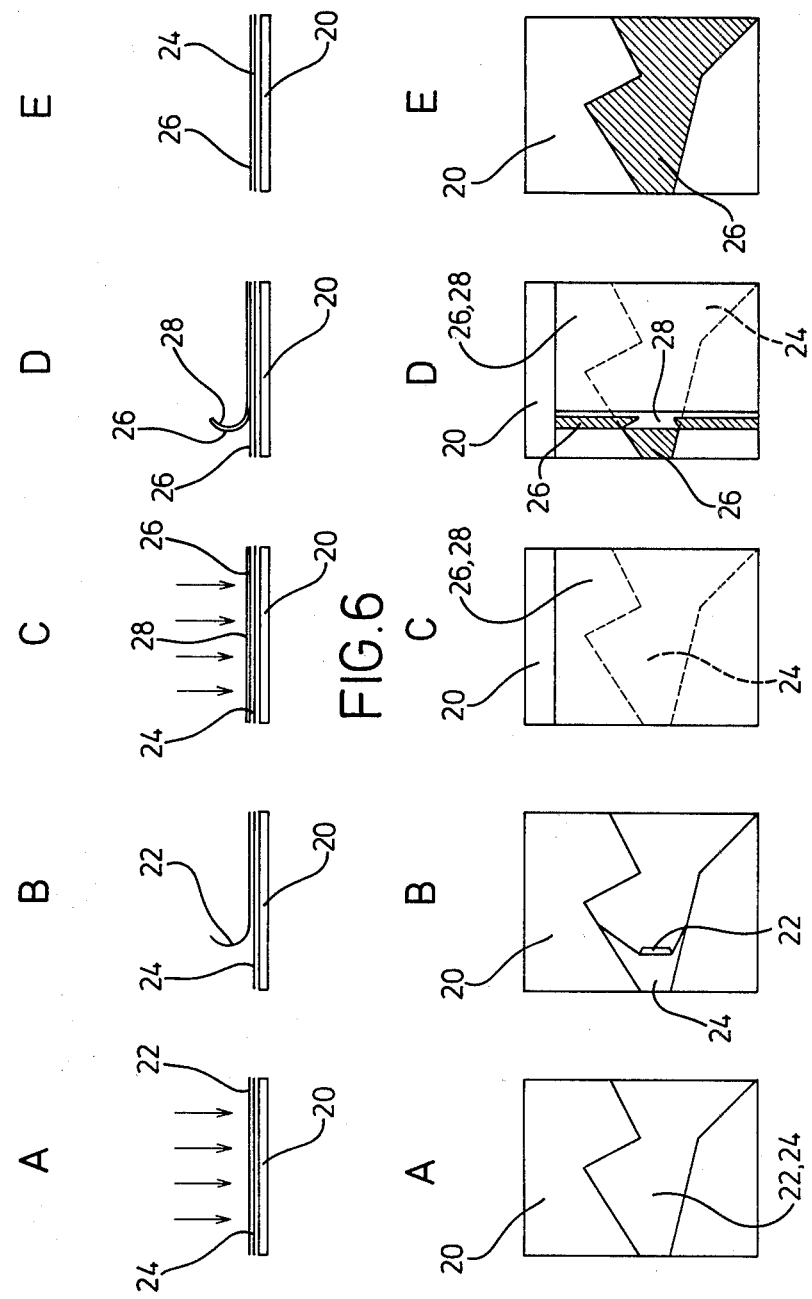

PICTURE-MAKING DEVICE

This invention relates to a picture-making plate, more particularly to a picture-making plate for producing a picture by applying a coloring layer or a colored foil on the plate.

This invention also relates to a picture-making device which comprises a combination of the picture-making plate with a transfer film, on one side of which film is carried a releasable layer to be transferred.

Heretofore, in producing a picture, a paste has been applied on one whole surface of a base plate and then a colored paper or cellophane previously cut out in a desired pattern has been placed on the paste, or the paste has been applied directly on the colored paper or cellophane and then the latter has been placed on the base plate. However, the work of applying the paste on the whole surface of the base plate likely contaminates hands, clothes and places with the paste, and it is not so convenient but rather needs skill to place the colored paper or cellophane cut out in various patterns onto the base plate.

A relief printing or hot stamping process has hitherto been employed in order to press and transfer a coloring agent or a metal foil supported on a transfer film. Thus, a heater has inevitably been required for the process with enlargement of the apparatus and complicated operation at a relatively high cost. Further, the conventional process is not suitable for the production in a small quantity and the product lacks in personality.

It is therefore a general object of the invention to provide a picture-making plate for conveniently producing a picture without any disadvantage as hereinbefore described.

In accordance with the invention there is provided a picture-making device which comprises a base plate, an adhesive layer which is applied on one surface of the base plate and a liner which is superposed releasably on the surface of the adhesive layer.

Another aspect of the invention is to provide a picture-making device without any heating means in which an adhesive layer preferably a pressure-sensitive adhesive layer on a base plate is partly exposed by releasing a liner, and then a coloring agent or a metal foil is transferred from a transfer file onto the exposed adhesive layer.

A further aspect of the invention is to provide a picture-making device which comprises a combination of the picture-making plate described above and a transfer film, on one surface of which film is carried a releasable layer to be transfered.

In the picture-making plate of the invention, the base plate may be made of glass, metal, plastics, leather, paper, rubber, polystyrene foam or the like, or it may be made of transparent plastic material such as polyvinyl chloride, ABS (acrylonitrile butadiene styrene) resin, polycarbonate resin, polypropylene, acrylic resin, polyethylene or epoxy resin to constitute a stained plastic plate.

The adhesive layer used in the picture-making plate of the invention may be preferably pressure-sensitive so as to permit application of a colored paper or cellophane onto the plate by pressure with only a finger.

The liner used in the picture-making plate is preferably black in color and has a releasable surface on the superposed side with the surface more preferably being treated with silicone resin as a release agent.

In the picture-making device of the invention, a pressure sensitive double-coated adhesive tape or sheet may be used in place of the adhesive layer. In this case, it is unnecessary for the base plate to carry the adhesive layer and the liner. Also, in place of the double-coated tape, a transfer-tape may be used, which carries adhesive in a film form on a release paper.

Further, the picture-making device of the invention may be constituted so that the liner can conveniently be released and a regular pattern can be easily produced. For this purpose, the device carries the liner having the cut lines in a regular pattern, preferably a lattice pattern.

In the transfer film used in the picture-making device of the invention, the substrate of the film may be made of paper, cloth, plastics, metal foil, or complex film thereof, preferably made of transparent material in order to observe from the backside of the film whether a coloring agent has been released or not. The layer to be transferred, which is carried on the transfer film, may consist of a dyestuff-based or pigment-based coloring agent or a metal foil which presents metallic color.

In the case of using the metal foil, such a kind of adhesive may be applied on the metal foil as has affinity to the adhesive layer or the double-coated adhesive tape or sheet.

Other objects and advantages of the invention will become obvious after considering the detailed discussion of the invention in connection with the preferred embodiments thereof shown in the accompanying drawings.

Figure 7:
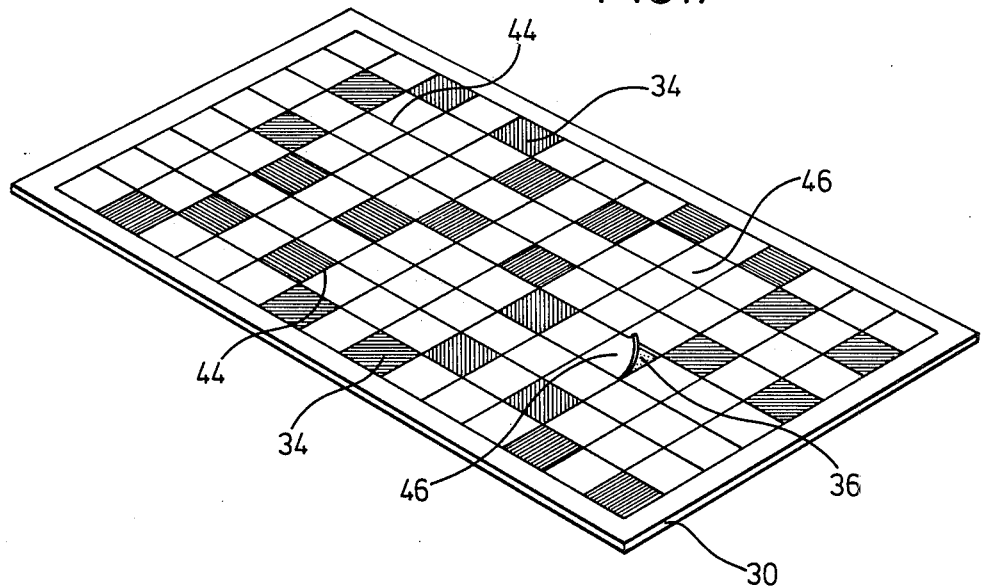
Figure 8:
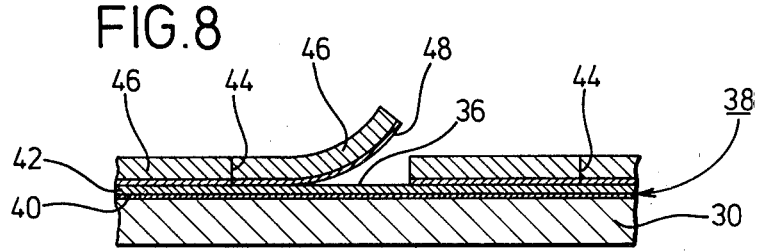
Figure 9:
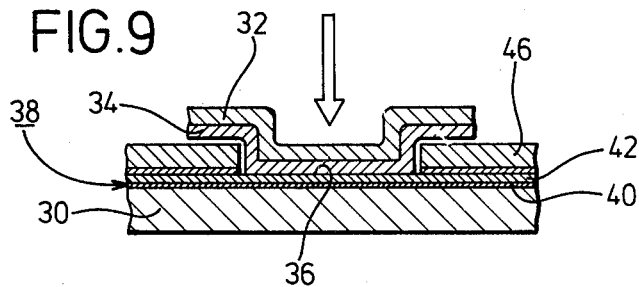
Figure 10:
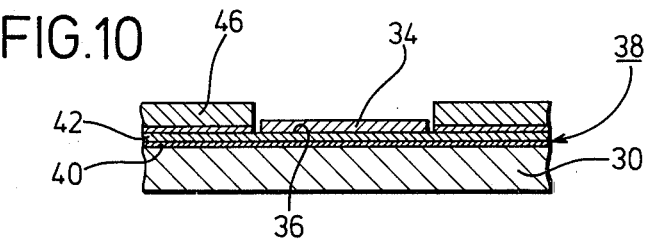
Figure 11:
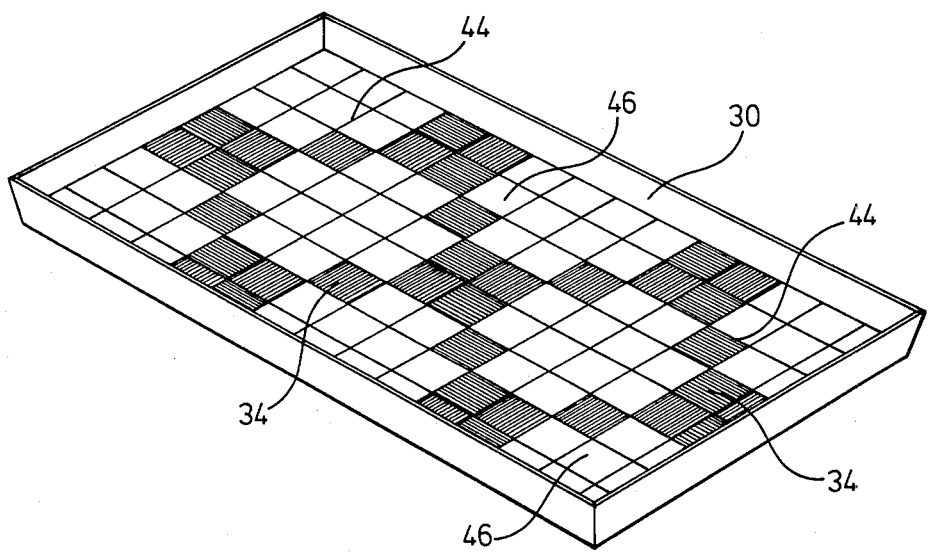
Figure 12:
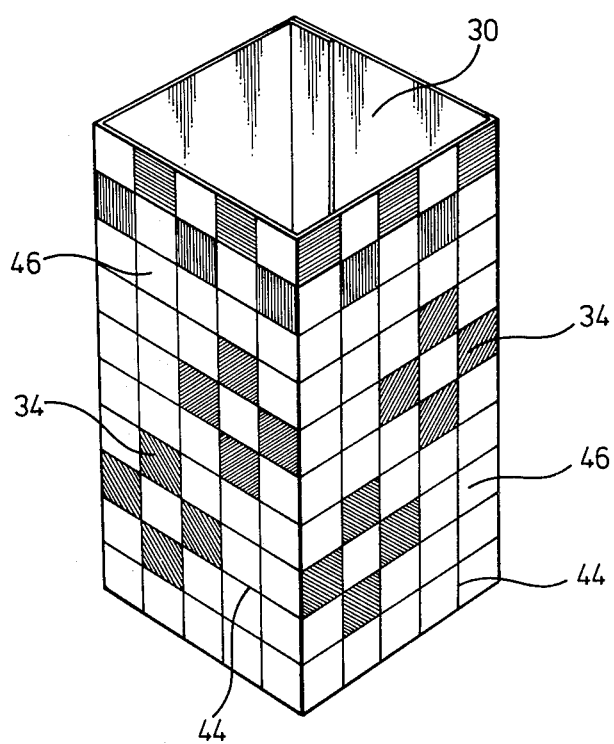

FIGS. 5A to E are pictorial views of the device showing a process for producing a picture in one embodiment using an double-coated adhesive tape in place of the adhesive layer;

FIGS. 6A to E are plan views of the device of FIGS. 5A to E;

FIG. 7 is a perspective view of the device of an embodiment having the outlines in a lattice pattern on the liner;

FIGS. 8 to 10 are sectional views of a device showing a process for producing a picture by using the picture-making device of FIG. 7;

FIGS. 11 and 12 are perspective views of the product produced by the picture-making device of FIG. 7.

Figure 1:
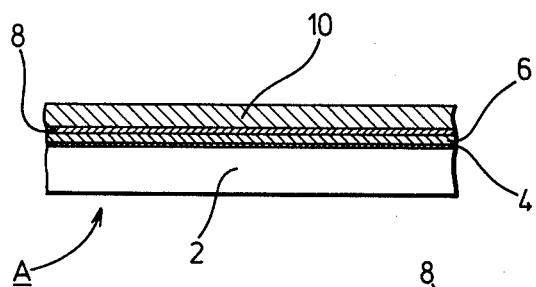
FIG. 1 is a fragmentarily enlarged sectional view of the picture-making plate according to the invention.

In FIG. 1, a stained plastic plate A is shown as one embodiment of the picture-making plate in accordance with the invention.

The picture-making plate A comprises a prime-coating of commercially available transparent primer 4, a transparent plastic plate 2, which is coated with a known pressure-sensitive transparent adhesive layer 6 applied on one surface of the plate 2 through the prime-coating 4 and a black liner 10 which is coated with a release agent 8 of silicone resin.

Figure 2:
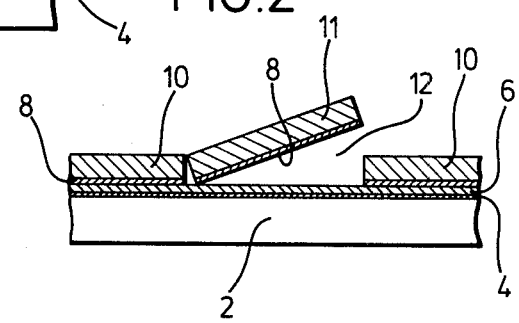
FIGS. 2 to 4 are sectional views of the device showing a process for producing a picture by means of the picture-making plate of the invention.
Figure 3A:
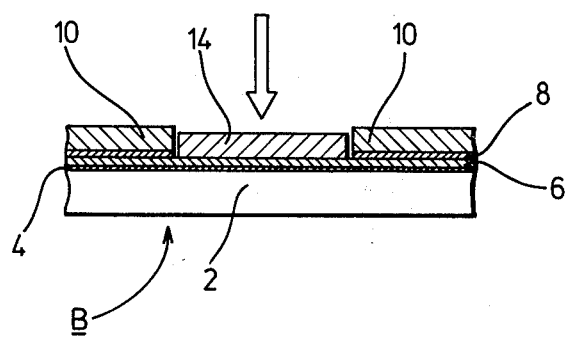
Figure 3B:
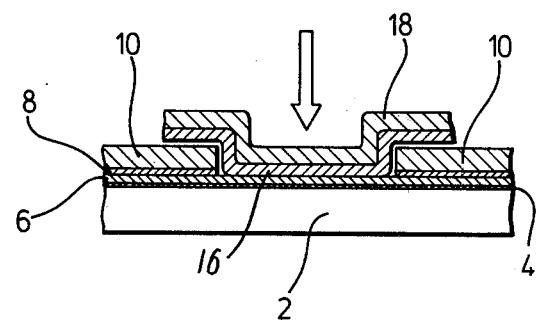
Figure 4:
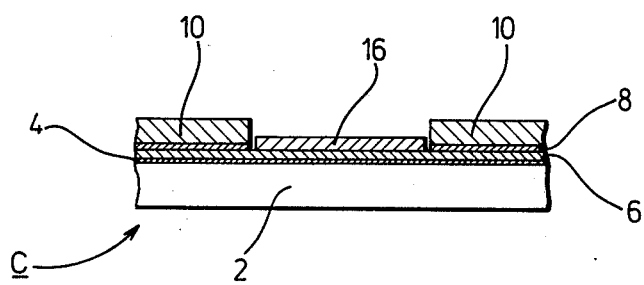

In this embodiment, various patterns such as geometrical ones to be cut are drawn on the black liner 10. The cut lines are provided along the drawn pattern with a cutter, and the drawn piece 11 of the black liner 10 is peeled off to expose the adhesive layer 6 and form a cavity 12 as shown in FIG. 2 and then a colored cellophane 14 which has previously been cut into the profile of the piece 11 is placed in the cavity 12 to obtain a stained plastic plate B as shown in FIG. 3 (A). Alternatively, a transfer film 18 carrying a desired colored foil 16 may be placed over the cavity 12 as shown in FIG. 3 (B) for depression with a finger and subsequently released therefrom to leave the foil 16 attached on the adhesive layer 6, thus resulting in forming a stained plastic plate C as shown in FIG. 4.

FIGS. 5 and 6 show the embodiment of the picture-making device using the double-coated adhesive tape as the adhesive layer.

In producing a picture according to this embodiment, a basic plate 20, a double-coated adhesive tape or sheet 24 and a transfer film 28 are prepared. The double coated adhesive tape or sheet 24 is pressure-sensitive and carries a conventional adhesive with a release paper 22 on the top surface of the tape. The substrate of the tape is made of paper, cloth, plastic film, e.g. urethane foam, cellophane, acetate, polyester, vinyl, polyethylene, teflon, polypropylene or the like, or metal foil or complex film thereof. The transfer film may be prepared by supporting the variously colored metal foil 26 on a transparent plastic film by any procedure such as vapor deposition technique.

The procedure for producing a picture according to this embodiment comprises steps A to E as shown in FIGS. 5 and 6.

In the step A the double-coated adhesive tape 24 which has previously been cut into a desired shape along with the release paper 22 is applied on a desired part of the base plate 20.

In the step B the release paper 22 is peeled off from the double-coated tape 24.

In the step C the transfer film 28 carrying a metal foil 26 is placed over the tape 24 under the pressure for contact therewith. In the step D the transfer film 28 is peeled off to leave the metal foil 26 on the part of the tape 24 in contact with the metal foil 26. Thus, a picture with various metallic color tones is produced by the step of applying the metal foil 26 of the desired shape onto the base plate 20 with the double-coated tape 24.

If desired, an additional metal foil or foils may be overlayed on the picture produced by the procedure shown in FIGS. 5 and 6 by repeating the same procedure as described hereinbefore.

FIGS. 7 to 12 show the embodiment of the picture-making device in which the cut lines are provided on the liner in a lattice pattern.

In these Figures, the numerical reference 30 represents the base plate which may be made into articles of the desired shape. The basic plate 30 is made of any material which may be treated on the surface with the adhesive, such as glass, metal plate, plastic plate, leather, paper, rubber, expanded plastics etc., and preferably made of a laminated paper of tough quality for the purpose of producing an shaped article by bending the plate 30.

If desired, the basic plate 30 may be made of transparent material such as polyvinyl chloride resin, ABS resin, polycarbonate resin, polypropylene resin, acrylic resin, polyethylene resin, epoxy resin etc. to produce a stained glass-like picture or pattern.

On one surface of the base plate 30 is formed an adhesive layer 38 which has a pressure-sensitive surface 36 to receive a layer 34 to be transferred such as a coloring agent or foil. The layer 34 is transferred onto the plate 30 from the transfer film 32 by releasing the latter. The adhesive layer 38 may be obtained by applying a conventional pressure-sensitive adhesive 42 onto the base plate 30 which has previously been treated with a commercially available primer 40. The adhesive layer 38 may be desirably transparent. The transfer film 32 may be made of paper, cloth, plastic film, metal foil or complex film thereof and is preferably transparent to observe the releasing state of the layer 34 from the rear side of the film 32. The layer 34 may be a dyestuff-based or pigment based coloring agent having any color or a metal foil giving metallic color which can be transferred from the transfer film onto the surface 36 of the plate 30 by pressing and releasing to give a predetermined color.

On the surface 36 of the plate 30 is releasably superposed the liner 46 having the cut lines 44 in a lattice pattern. For this purpose, a silicone release agent 48 is applied onto the superposed surface of the liner 46 and the depth of the cut lines ranges from the surface of the liner to the rear side of the release agent 48. The liner 46 of preferably thin and tough kraft paper may suitably have a color different from the color of the layer 34 to be transferred such as white, black or gray.

The cut lines 44 are arranged in the lattice pattern in which the lines are divided into equal lengths in both vertical and lateral directions.

However, the cut lines may be arranged in any configuration such as radial or concentric arrangement depending on a picture or pattern to be produced and the lines themselves may be straight, curved or corrugated.

In case of the lattice arrangement regular patterns such as a mosaic, alignmental or sequential pattern may be provided; and the device may be used for instructional purposes.

Each small piece of the liner 46 partitioned by the cut lines 44 is removed by peeling to expose the surface 36 and the layer 34 to be transferred is placed over the exposed surface 36 under pressure. If desired, additional cut lines in a different configuration from the original one may be provided on the liner 46 at the time of producing a picture and the resulting small piece in a different shape is removed to expose the surface 36 in the corresponding shape.

According to the embodiment shown in FIGS. 7 to 10, the small piece surrounded by the cut lines 44 is removed at the desired area by peeling off to expose the surface 36 as shown in FIG. 8. Then, the transfer film 32 is placed and pressed over the exposed surface 36 so as to contact the layer 34 with the surface 36 as shown in FIG. 9 and then the transfer film 32 is released to leave the layer 34 attached on the surface 36 as shown in FIG. 10. This procedure is repeated to produce a desired picture or pattern.

The picture or pattern produced on the basic plate 30 in the manner as hereinbefore described may be bent or combined with others if necessary for example to form a box as shown in FIG. 12 or to make a tray by bending an edge portion of the base plate 30 as shown in FIG. 11. In preparation of such a box or tray, it is very convenient to arrange the cut lines 44 in the lattice pattern in order to facilitate bending of the basic plate 30.

Further, according to this embodiment, on account of the cut lines 44, small pieces partitioned by the cut lines can be conveniently and smoothly released from the adhesive layer 42 and the picture or design never become confused or irregular. In addition, even after preparation of a handiwork such as box or tray the small pieces can be released easily and therefore a beautiful picture or pattern can be produced after the completion of the handiwork. In particular, when the lattice pattern is employed in the arrangement of the cut lines 44 as shown in FIGS. 7, 11 and 12, a picture of mosaic pattern or gradated or mixed color is readily obtainable and also Munsell's color solid can be prepared by bending, breaking and combing the base plate 30, and by this procedure education in the color system may be achieved.

As hereinabove fully described, the picture-making plate according to the invention carries the liner attached thereon, does not require any paste or adhesive during the production of pictures and does not use any heating means such as a heater. Therefore, the picture-making plate may be more readily handled and operated by not only an adult but also a little child than in any other conventional device. Nevertheless, the plate of the invention has a high practicability and usefulness capable of employing a higher technique to produce an artistic work.

The picture-making device according to the invention is suitably used for the production of a picture or pattern as a plate for applying a colorful decoration thereon, as a base plate for indicating a color system or as a teaching material. In addition, the device of the invention may be used to produce an oil painting-like article with the ability to represent a stained glass-like or mosaic article by selecting a material of the base plate, a configuration of the cut lines etc., and may be provided at reduced cost because of the simple construction of the device.

It will be appreciated that various other modifications, alternative constructions and equivalents may be employed without departing from the spirit and scope of the invention.

What we claim are:

1. A picture-making device comprising in combination a picture-making plate and a transfer film, said picture-making plate comprising a base plate, an adhesive layer disposed on one surface of said base plate and a liner which is superposed releasably on the surface of said adhesive layer, said liner having a plurality of cut lines in a square lattice pattern, and said transfer film comprising a transparent carrier carrying on one surface thereof a releasable layer comprising a coloring agent that contrasts well with said liner to be transferred in part to a portion of said adhesive layer from which a corresponding overlying square portion of said liner has been removed, said releasable layer having greater adhesion to said adhesive layer than to said transparent carrier but having greater adhesion to said transparent carrier than to said liner, whereby said releasable layer transfers to said picture-making plate only in those areas from which said liner has been removed.

2. A picture-making device as claimed in claim 1 in which the base plate is made of a transparent plastic material selected from the group consisting of polyvinyl chloride, acrylonitrile butadiene styrene resin, polycarbonate resin, polypropylene, acrylic resin, polyethylene and epoxy resin to constitute a stained plastic plate.

3. A picture-making device as claimed in claim 1 in which the adhesive layer is pressure-sensitive.

4. A picture-making device as claimed in claim 1 in which the liner is black in color and the superposed surface thereof is treated with a release agent.

5. A picture-making device as claimed in claim 4 in which the release agent is silicone resin.

6. A picture-making device as claimed in claim 1 in which a double-coated adhesive tape or sheet is used as the adhesive layer.

7. A picture-making device as claimed in claim 6 in which the base plate is made of a material selected from the group consisting of glass, metal, plastics, leather, paper, rubber and expanded polystyrene, which is treated with adhesive or applied with a double-coated adhesive tape.

8. A picture-making device as claimed in claim 6 in which the layer to be transferred consists of a dyestuff based or pigment based coloring agent or a metal foil.

9. A picture-making device as claimed in claim 8 in which an adhesive is applied on the metal foil, said adhesive having affinity to the adhesive layer or the double-coated adhesive tape or sheet.

* * * * *